Figure 1:
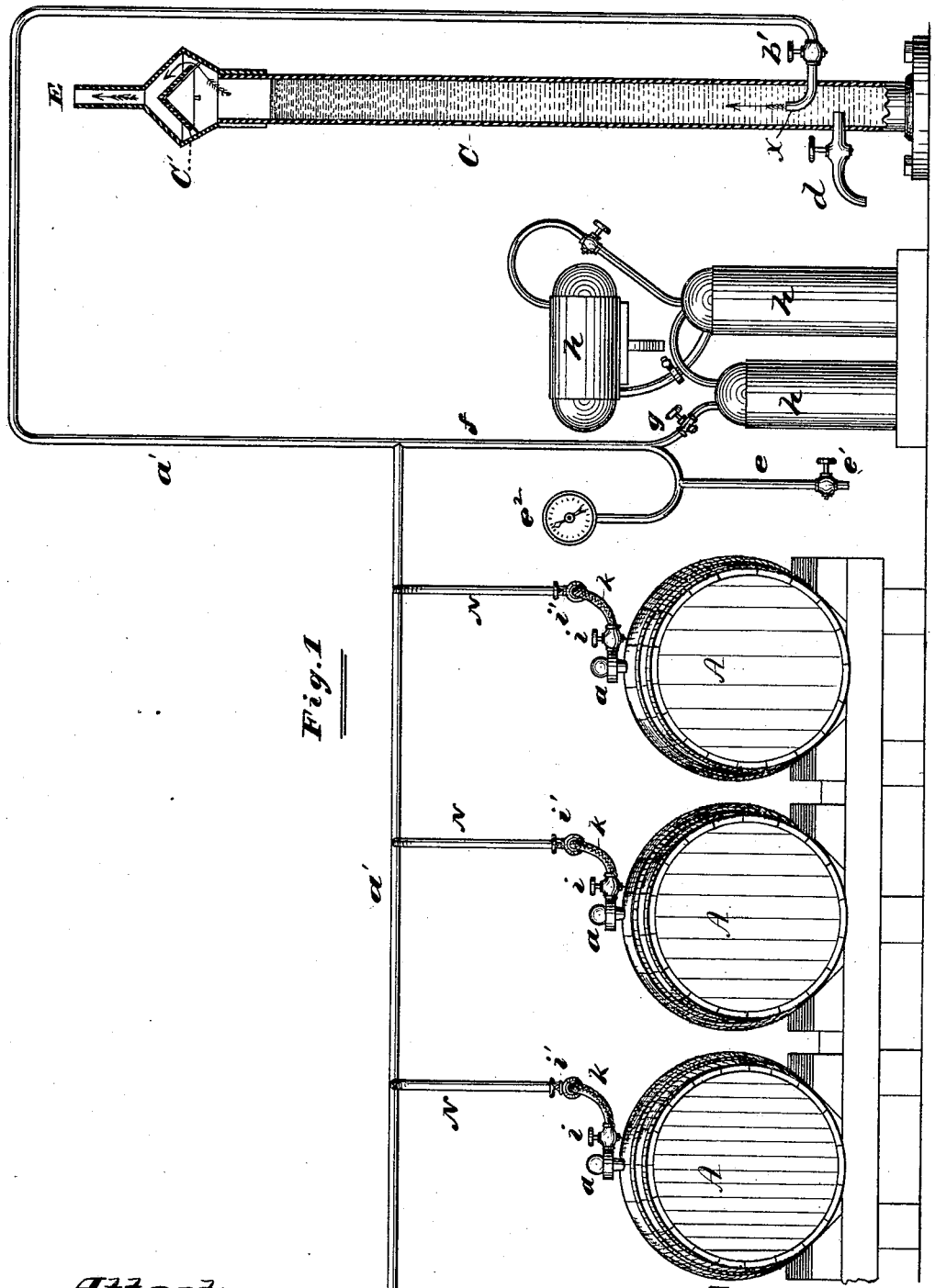

L. MELLER & E. HOFMANN.
Process for Making Beer.

No. 215,679. Patented May 20, 1879.

Attest:
W. S. Baker
H. Fasking

INVENTOR:
Leonard Meller
Edmund Hofmann
By Fred. W. Wolf.
Attorney.

UNITED STATES PATENT OFFICE.

LEONARD MELLER, OF LUDWIGSHAFEN-ON-THE-RHINE, BAVARIA, AND EDMUND HOFMANN, OF MANNHEIM, BADEN, GERMANY, ASSIGNORS TO GEORGE BARTHOLOMAE, OF CHICAGO, ILLINOIS.

IMPROVEMENT IN PROCESSES FOR MAKING BEER.

Specification forming part of Letters Patent No. 215,679, dated May 20, 1879; application filed February 12, 1879; patented in France, November 30, 1876, and in Belgium, February 28, 1877.

*To all whom it may concern:*

Be it known that we, LEONARD MELLER, of Ludwigshafen-on-the-Rhine, in the State of Bavaria, and EDMUND HOFMANN, Mannheim, in the State of Baden, Germany, have invented certain new and useful Improvements in the Art of Making Beer; and we hereby declare the following to be a full, clear, and exact description thereof, reference being had to the accompanying drawing, making a part of this specification, in which the figure represents an end view of our apparatus with the water-column in section.

Heretofore, in brewing beer, after cooking and cooling, the beer has been put into open vessels to ferment. The fermentation lasts, say, fifteen days, and then the beer is drawn off from the yeast into large casks nearly closed, where it remains from one to six months to settle, and among the sediment there will still remain some yeast. The beer is then pumped into shaving-casks, and is mixed with young beer, (kraeusen,) which starts a mild fermentation, lasting from ten to fifteen days, until the generation of the gas is reduced to a minimum. During this fermentation the beer effervesces through means of the carbonic-acid gas rising, and the lighter particles of yeast and solid matter are thrown to the top, forming a foam, which, during the ebullition, runs over the edges of the opening in the cask, and carrying along a small portion (more or less) of the beer, which is wasted, and this waste has to be replaced by refilling with new beer daily. This wastage we estimate, from practical experience in the manufacture, to be about one barrel in every forty, more or less. This waste beer, running down around the casks and on the floor of the cellars, sours and produces a mildew, which impregnates the air with foul vapors, highly injurious to the workmen, and, permeating the beer in the casks, alters its flavor, and, in instances where the mildew penetrates the wood of the casks, spoils the beer entirely. This fouling of the barrels requires that they should be washed outside from time to time, and the water used in this washing always raises the temperature of the cellar, and wastes the ice which is therein packed to keep the temperature about 41° Fahrenheit. After the beer has been in the shavings-casks from ten to fifteen days, the gelatine or other clarifying medium is introduced, and at the end of a couple of days the beer is entirely clear. The shavings-cask is then bunged up tightly for from three to five days, to confine the last portions of the rising carbonic-acid gas. This charges the beer with carbonic-acid gas, ($CO_2$,) so as to make it merchantable, and it must be drawn off at once into kegs and used; otherwise the pressure on the shavings-cask may burst it.

In selecting the time for drawing off the beer from the shavings-casks into the kegs to send it to market, the beer should never be under a pressure of over seven pounds to the square inch; otherwise the keg fills with foam in the drawing off, and the bubbles subsiding leaves an air-space over the liquid beer, which absorbs a portion of the carbonic-acid gas, and soon leaves the beer in the keg flat. As the art is now practiced, arriving at the proper degree of pressure when to put the beer in kegs is merely a matter of judgment or guess by the foreman, and no two shavings-casks will be drawn off at precisely the same pressure, and the effervescing qualities of the beer will vary considerably, much to the detriment of sales by the brewer. If the beer is not put in market at once at this stage, the bungs have to be removed from the casks and the gas allowed to escape. Then the escaping gas stirs up the yeast and impurities that have settled to the bottom, and the beer has to go again through the entire shavings-cask step in the process.

Under the processes now in use it requires about twenty days to put beer on the market after it is pumped into the shavings-casks. This delay requires brewers to keep a large amount of capital invested during the time in unfinished beer, and it is highly important to decrease this time of preparation.

The essential features of our invention have been patented in foreign countries as follows:

France, to Leo. Meller & Co., filed September 28, 1876; allowed and countersigned Paris, November 30, 1876, No. 114,737. Belgium, to Leo. Meller & Co., filed February 14, 1877; allowed and countersigned Bruxelles, February 28, 1877, No. 41,517.

The object of our invention is to overcome the difficulties above named, and also to produce in a shorter time a better quality of beer containing more sugar and less alcohol.

Our invention consists in treating the beer when in the shavings-cask step of the process in one or more closed casks under automatically-controllable carbonic-acid-gas pressure, generated either by the mild fermentation of the beer or artificially. This equalizes the pressure in such cask or series of casks, and the effervescing quality of the beer in all the casks when two or more are connected together is uniform.

The cask or casks being closed, none of the beer wastes by running over, and the foul smells and washing of the casks and cellars are avoided. The escaping carbonic-acid gas is conducted from the relief-valve to the open air, and does not settle in the brewing-cellars to endanger life.

Our invention consists, further, in similarly treating the beer when in the "kraeusen" stage, or subsequently thereto, or both; or when in the settling-casks, ("ruh-beer,") this being the second fermenting stage—that is to say, our invention consists in so treating the beer at any time or times previous to racking off and bunging or bottling.

In order that those skilled in the art may make and use our invention, we will proceed to describe the manner in which we have carried it out.

In the drawings, A A are shavings-casks, having faucets $a\ a$, provided with valves $i\ i$, inserted tightly in their bungs. These faucets are connected to taps N on the main pipe $a'$ by means of flexible sections $k$, provided with couplings. The taps or connections N have valves $i'\ i'$. Pipe $a'$ bends upward and passes above the level of a water-column, C, and then, passing downward, enters the base of the column at $x$, where it is provided with a cock, $b'$. The water column or vessel C has a faucet, $d$, to draw off water when desired to decrease the pressure. A depending branch pipe, $e$, and cock $e^1$ serve to discharge any condensed moisture from pipe $a'$, and a pressure-gage, $e^2$, serves to indicate the pressure.

By means of a gas-generator located at $h$, and connected to pipe $a'$ by means of pipe $f$, having cock $g$, we are enabled to test the joints of the apparatus and drive all atmospheric air from the pipes when the operation begins.

At the top of the water-column is a conical cap, terminating in a pipe, E, which is projected out of the building and leads all the gas into the open air. Located within this cap is a conical diaphragm, C', centrally located, so that should the escape of the gas become so rapid as to lift the body of water upward, the water will be arrested by the diaphragm, while the gas escapes around its edges.

It is evident that the pressure in all the shavings-casks connected with pipe $a'$ will be equal, and be kept so indefinitely by means of the water-column, and as far as the enlivening of the beer is concerned, it is always ready for market, be it in ten days or four months; whereas in processes now practiced beer has to be bunged at a particular time for a particular day's market.

Our process enables the brewer to keep on hand merchantable beer, which can be shipped instantly, or, if trade decreases, it enables him to keep his stock on hand without deterioration till the demand is made for it.

All that has been said above in relation to a series of casks applies, of course, equally to treatment in a single cask.

It is obvious that means other than a water-column may be adopted for equalizing the pressure of the gas without departing from the spirit of our invention—as, for example, safety-valves and the like—and the apparatus is susceptible of many other variations without affecting the process itself, which constitutes the essence of our invention.

By using our process we are enabled to clarify the beer and clear it of impurities in eight days or less, whereas in the ordinary processes it takes from twelve to twenty days. This immense gain in time we ascribe to the following action: The air being forced out of the pipes, the carbonic acid fills them and the space in the casks above the beer. Then the gas slowly accumulates in the space above the beer until the pressure above is such as to overcome the density of the beer and re-enter it, so as to charge it up to the pressure for which the column is set. This creates, in a manner, an equilibrium between the rising bubbles and the pressure above, during which gravity can act rapidly on the yeast and impurities in the beer, and carry them down among the shavings at the bottom of the cask, where they remain.

We introduce the clarifying gelatine into the shavings-casks after the beer is introduced, and before connecting with pipe $a'$, and actual practice has demonstrated to us that to clarify the beer by our process requires only about one-half of the gelatine heretofore used. This saving, together with the saving of the waste beer heretofore mentioned (one or more barrels in every forty) and the saving of labor, will greatly cheapen the production of beer.

When we desire to make beer for bottling we attach our apparatus to the settling-casks filled with beer, and no young beer (kraeusen) is added; but a little gelatine is added, and the beer allowed to remain for from fourteen to twenty days until it becomes "lively," (saturated with $CO_2$,) and it is then bottled.

We find that bottled beer prepared this way is healthier, and will last in good condition two or three months, whereas the beer bottled in the usual manner with kraeusen beer lasts only for eight or ten days if pure and not steamed after bottling, the latter spoiling the aroma and flavor.

Having thus described our invention, what we claim as new, and desire to secure by Letters Patent, is—

1. The process of preparing beer for the market, which consists in holding it under controllable pressure of carbonic-acid gas when in the "kraeusen" stage, substantially as set forth.

2. The process of treating beer when in the kraeusen stage, which consists in holding it in a vessel under automatically-controllable pressure of carbonic-acid gas, substantially as described.

3. The process of preparing and preserving beer for the market, which consists in holding it under controllable pressure of carbonic-acid gas from the beginning of the kraeusen stage until such time as it is transferred to kegs and bunged, substantially as described.

4. The method herein described of preserving beer in a marketable condition after it has passed the kraeusen stage, which consists in holding it under pressure of carbonic-acid gas, said pressure being automatically regulated by a counteracting hydrostatic pressure, substantially as described.

5. The process of treating beer when in the second fermenting stage, ("ruh-beer,") which consists in holding it under automatically-controllable pressure of carbonic-acid gas, substantially as described.

6. The process of treating beer in the course of its manufacture, which consists in holding it in closed connected vessels under automatically-controlled pressure of carbonic-acid gas, substantially as described.

7. The process of clarifying and settling beer in a series of shavings-casks, and equalizing the rate of fermentation in all of them, whereby the beer is more rapidly and thoroughly clarified, and will be ready for racking off in all the casks at the same time, and can be kept so, which consists in holding the beer in closed connected shavings-casks under automatically-controlled low pressure of carbonic acid gas, substantially as described.

8. Casks A A, provided with cocks $a$ $a$, flexible sections $k$, and taps N N, in combinatio with main pipe $a'$, water-column C, and pressure-gage $e^2$, all constructed, arranged, and operated as and for the purposes set forth.

LEONARD MELLER.
EDMUND HOFMANN.

In presence of—
PH. BARTHOLOMAE,
P. BERRETOO.